Jan. 15, 1963 SVEN-OLOF KRONOGÅRD 3,073,181
HYDRODYNAMIC TRANSMISSION CONTRIVANCES
Filed March 6, 1957
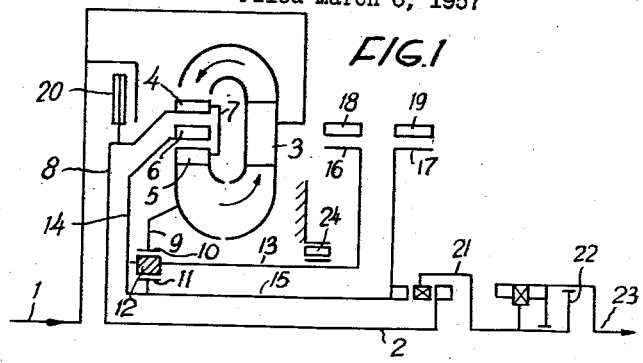
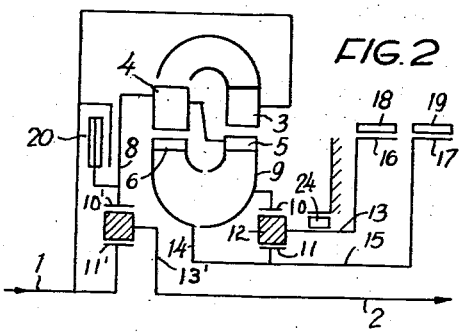
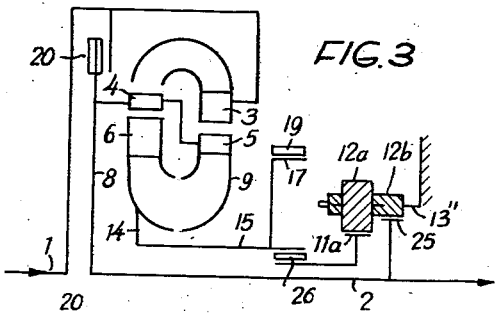
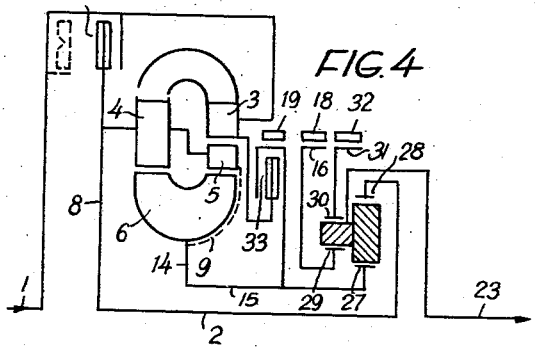
INVENTOR.
Sven-Olof Kronogård
BY
Pierce, Scheffler & Parker
Attorneys United States Patent Office 3,073,181
Patented Jan. 15, 1963

3,073,181
HYDRODYNAMIC TRANSMISSION CONTRIVANCES
Sven-Olof Kronogård, Göteborg, Sweden, assignor to Aktiebolaget Volvo, Göteborg, Sweden, a corporation of Sweden
Filed Mar. 6, 1957, Ser. No. 644,323
Claims priority, application Sweden Mar. 7, 1956
14 Claims. (Cl. 74—677)

The present invention refers to hydro-dynamic torque converters and particularly to such converters intended for use in motor vehicles.

One object of the invention is to provide a hydro-dynamic torque converter which is of simple design but nevertheless provides for three gears forward drive and one speed for backward drive.

Another object of the invention is to provide a hydro-dynamic torque converter in which the flow losses are very low.

A further object of the invention is to provide a hydro-dynamic torque converter which is capable of transmitting high torques while maintaining the mechanical stresses within the converter at a low level.

These and other objects are achieved by means of a hydro-dynamic torque converter comprising an input shaft, a pump member of the radial outflow type and drivingly connected to said input shaft, the turbine member comprising at least two steps, the first of one of said steps being of the radial inflow type and having an outer radius substantially equal to the outer radius of said pump member, a rotatable reaction member having at least one step, each of said turbine and reaction steps including a blade rim secured to a rotor disk, the rotor disk of said reaction member being enclosed between the rotor disks of said turbine member, an output shaft connectible directly to the first one of said turbine disks, a reversing gear drivingly connecting the rotor disk of said reaction member with another of said turbine rotor disks, said other turbine rotor disk being connected to said first turbine rotor disk outside the free edge of said reaction member.

A rotor disk is here understood to consist of a disk carrying a blade rim and adapted to transmit torque to a shaft and/or to form a portion of the wall of the torus-shaped circuitous path for the power transmitting medium, that is to say for the oil.

For a better understanding of my invention reference is had to the following description taken in connection with the accompanying drawing, in which FIGS. 1–4 show in a diagrammatic manner four embodiments of hydro-dynamic torque converter according to the invention.

Referring to the drawings, FIG. 1 illustrates a torque converter having an input shaft 1 and an output shaft 2. The input shaft 1 is connected to a pump member 3 of the radial outflow type forming part of the converter proper which further includes a turbine member comprising a first step 4 and a second step 5, and a rotatable reaction member 6 located between said turbine steps. According to FIG. 1 the turbine blades and the reaction blades are of the radial inflow type, the first turbine step 4 having an outer radius susbtantially equal to the outer radius of the pump member 3.

The two turbine steps 4 and 5 are directly interconnected by means of a ring element 7 which extends outside the free edges of the reaction member 6 and forms part of the core of the torus-shaped circuit for the working fluid. The main portion of the core is constituted by the shroud rings of the pump member and the second turbine step member which members also carry wall elements defining the major part of the outer wall of the circuit.

The turbine blade rims 4 and 5 are carried by rotor disks 8 and 9 respectively. The rotor disk 8 is secured to the output shaft 2 while the rotor disk 9 is connected to a ring wheel 10 of a planetary gearing which further comprises a sun wheel 11 and planet wheels 12 which latter are journalled in a planet wheel carrier 13.

The blades of the reaction member 6 are carried by a rotor disk 14 located between the rotor disks 8 and 9 and secured to a shaft 15 which carries the above-mentioned sun wheel 11.

The shafts 13 and 15 carry brake drums 16 and 17, respectively co-operating with brake bands 18 and 19. The optut shaft 2 may be directly connected to the input shaft 1 by means of a lamella coupling 20 carried by the rotor disk 8.

Reference numeral 21 denotes the movable member of a claw-coupling. This coupling member 21 is connected to the piston 22 of a hydraulic servo motor and may be moved to the right from the neutral position shown to provide forward drive and to the left to provide backward drive of the main output shaft 23 of the transmission.

Between the planet wheel carrier 13 and the stationary housing there is provided a free wheel device 24 which prevents the planet wheel carrier from backward rotation.

When the vehicle is to be started the coupling member 21 is moved to the right, thereby connecting the output shaft 2 to the main output shaft 23 of the transmission. When the engine is accelerated the pump member 3 creates a flow of liquid within the converter so that the turbine and reaction members begin to rotate. The two members rotate in opposite directions and the torque from the reaction member 6 is reversed in the planetary gearing 10, 11, 12 and transferred to the blades of the second turbine step 5. The combined torque from the reaction member 6 and the second turbine step 5 is transmitted through the ring element 7 and the blades of the first turbine step 4 to the disk 8 of said last-named step and hence to the output shaft 2.

During this starting period both brake bands 19 and 18 are loosened and the clutch 20 is not engaged. The reaction forces occurring in the planetary gearing act upon the planet wheel carrier 13 which is supported against backward rotation by the free wheel device 24. During this phase of operation the torque multiplication is high.

When the vehicle has reached a predetermined speed the brake band 19 is tightened. Thereby the reaction member 6 is held stationary and the free-wheel device 24 is relieved.

Upon further increase of the vehicle speed the brake band 19 is loosened and the clutch 20 is engaged thereby providing direct drive. During this third phase of operation the torque converter is idling.

It is sometimes desirable to use the converter and the engine for braking purposes. Such a braking effect may be obtained by tightening the brake band 18 during the first phase of operation. Thereby the planet wheel carrier 13 will be prevented from rotation also in forward direction.

In order to obtain backward drive the coupling element 21 is moved to its left end position. Thereafter the backwardly rotating shaft 15 constitutes the output shaft. In other respects the converter elements function in the same manner as during the first phase of operation under forward drive.

In the embodiment according to FIG. 2 the second turbine step 5 is located radially inside of the pump member 3. Further, there is provided a summation gear between the input shaft 1, the rotor disk 8 of the first turbine step 4 and the output shaft 2, this summation gear consisting of a planetary gearing the sun wheel 11' of which is connected to the input shaft 1 whereas its ring wheel 10' is connected to the rotor disk 8 and the planet wheel carrier 13' is connected to the output shaft 2. In this manner so-called split torque is obtained, which results in a higher total efficiency and smaller dimensions of the torque converter.

According to FIG. 3 the reversing gear consists of a stationary planet gear carrier 13'' which carries two sets of planet wheels 12a and 12b which are in engagement with each other. The planet wheels 12a are in engagement with a sun wheel 11a connected to the shaft 15 of reaction member 6. The planet wheels 12b are in engagement with the sun wheel 25, carried by the output shaft 2.

In this case there is no provision for backward drive. The backwardly rotating shaft 15 of the reaction member 6 is made of two parts interconnected through a free wheel device 26 which permits locking of the reaction member 6 by tightening of brake band 19 during the second phase of operation.

In the embodiment shown in FIG. 4 the reaction member 6 is located in the inner bend of the fluid circuit. The main output shaft 23 is connected to the planet wheel carrier of the reversing gear the planet wheels of which are of the stepped type. The larger portions of the planet wheels are engaged by the sun wheel 27 of the planet wheels are engaged by the sun wheel 27 connected to the reaction member 6 and by a ring gear 28 connected to the turbine member 4, 5. The smaller planet wheel portions are engaged by a sun wheel 29 connected to the drum 16 for the brake band 18 and by a ring wheel 30 connected to a drum 31 for a brake band 32 for backward drive.

In this case there is also a clutch 33 between the shaft 14 of the reaction member 6 and the pump member 3. This clutch is engaged simultaneously with the clutch 20 for direct drive which results in that all elements in the torque converter and in the reversing gear rotate as a single unit.

In all embodiments shown the first turbine step is of the radial inflow type and has an outer radius substantially equal to the outer radius of the pump member. According to FIG. 1 the reversing gear is located within the space confined by the elements of the torque converter so that it is effectively lubricated.

In the counter rotation phase of operation the reaction member rotates in a direction opposed to that of the turbine member, the maximum speed of the latter then amounting to approximately half the speed of the pump. When two adjacent disks rotate in opposite directions, so-called ventilation losses are created by the fact that the medium between the disks is subjected to a certain pumping effect. These ventilation losses are dependent on the relative speed raised to the third power, from which one can readily understand the importance of the fact, that in accordance with the invention, the reaction member borders only upon the turbine member instead of on the pump member running at a speed twice as high.

I claim:

1. A hydrodynamic torque converter comprising an input shaft, a pump member of the radial outflow type and drivingly connected to said input shaft, a turbine member comprising at least two steps, the first one of said steps being of the radial inflow type and having an outer radius substantially equal to the outer radius of said pump member, a rotatable reaction member having at least one step, each of said turbine and reaction steps including a blade rim secured to a rotor disk, the rotor disk of said reaction member being enclosed between the rotor disks of said turbine member, an output shaft connectible directly to the first one of said turbine rotor disks, a reversing gear drivingly connecting the rotor disk of said reaction member with another of said turbine rotor disks, said other turbine rotor disk being connected to said first turbine rotor disk outside the free edge of said reaction member.

2. An arrangement according to claim 1, characterized in that the reaction member is adapted to be locked.

3. An arrangement according to claim 1, characterized in that the reversing gear comprises a rotatable and lockable reaction element.

4. An arrangement according to claim 1, characterized in that the reversing gear is constituted by a planet gear.

5. An arrangement according to claim 4, characterized in that a freewheel contrivance is provided between the rotatable reaction member, such as the planet wheel carrier, of the reversing gear and a stationary part, said freewheel contrivance preventing said element from rotating in a direction opposed to that of the turbine member.

6. An arrangement according to claim 1, characterized by the provision, in the transmission between the reaction member and the turbine member, of a freewheel contrivance adapted to disengage the reaction member when the rotary speed of the latter is lower than corresponding to the transmission ratio between the reaction member and the output shaft.

7. An arrangement according to claim 1, characterized in that the turbine member and the reaction member are adapted to be connected to a freely mounted output shaft with the aid of a coupling device.

8. An arrangement according to claim 1, characterized in that the reversing gear is located within a space confined by the elements of the hydrodynamic torque converter.

9. An arrangement according to claim 1, characterized by the provision, between the driving input shaft, the turbine shaft and the output shaft, of a so-called summation gear, the output shaft being connected to the summation elements of said gear, while the turbine shaft and the input shaft are connected each to one of the two remaining elements of the gear.

10. An arrangement according to claim 1, characterized in that the last turbine step is located so as to have the medium flowing therethrough in an outward radial direction, the next preceding reaction member being located, entirely or in part, in the inner bend of the circuitous path.

11. An arrangement according to claim 1, and which further includes a rotating pump housing, characterized in that the pump is located in the portion of the circuitous path turned from the input shaft, while the pump housing is provided with radial cooling flanges acting as fan blades, and that the turbine member and the reaction member are located, at least partly, in the portion of the circuitous path located adjacent to the input shaft.

12. An arrangement according to claim 11, characterized in that the pump blades and said cooling flanges and at least a portion of the inner limiting wall of the circuitous path are cast from light metal in an integral piece with said rotating pump housing.

13. An arrangement according to claim 1, characterized by a friction coupling between the input shaft and the turbine member.

14. An arrangement according to claim 1, characterized in that braking and coupling means are included in the torque converter and are of the friction type and operable by means of pressurized liquid.

References Cited in the file of this patent

UNITED STATES PATENTS

| | | |
|---|---|---|
| 2,260,015 | Fichtner | Oct. 21, 1941 |
| 2,590,472 | Soper et al. | Mar. 25, 1952 |
| 2,616,309 | Russell | Nov. 4, 1952 |
| 2,676,497 | Ahlen | Apr. 27, 1954 |
| 2,719,616 | Ahlen | Oct. 4, 1955 |
| 2,786,365 | Lammerz | Mar. 26, 1957 |